United States Patent
Kulkarni et al.

(10) Patent No.: US 10,260,598 B2
(45) Date of Patent: Apr. 16, 2019

(54) TRANSMISSIONS FOR OPPOSED-PISTON ENGINES WITH TWO CRANKSHAFTS

(71) Applicant: ACHATES POWER, INC., San Diego, CA (US)

(72) Inventors: Vadiraj Kulkarni, San Diego, CA (US); Balazs V. Palfai, Foster City, CA (US); Dnyandeo T. Sapkal, San Diego, CA (US); Fabien G. Redon, San Diego, CA (US); Sumanth Kashyap, San Diego, CA (US)

(73) Assignee: ACHATES POWER, INC., San Diego, CA (US)

( * ) Notice: Subject to any disclaimer, the term of this patent is extended or adjusted under 35 U.S.C. 154(b) by 336 days.

(21) Appl. No.: 15/142,261

(22) Filed: Apr. 29, 2016

(65) Prior Publication Data

US 2017/0314646 A1    Nov. 2, 2017

(51) Int. Cl.
*F01B 7/02* (2006.01)
*F02B 25/08* (2006.01)
*F16H 3/66* (2006.01)
*F16H 57/04* (2010.01)
*F02B 61/06* (2006.01)
*F01B 7/14* (2006.01)
*F02B 75/28* (2006.01)
*F16H 37/08* (2006.01)

(52) U.S. Cl.
CPC ............... *F16H 3/66* (2013.01); *F01B 7/14* (2013.01); *F02B 61/06* (2013.01); *F02B 75/282* (2013.01); *F16H 37/0826* (2013.01); *F16H 57/0435* (2013.01); *F16H 57/0475* (2013.01); *F16H 57/0484* (2013.01); *F16H 2200/0043* (2013.01); *F16H 2200/201* (2013.01); *F16H 2200/2046* (2013.01); *F16H 2200/2097* (2013.01)

(58) Field of Classification Search
CPC .................................. F01B 7/02; F02B 25/08
See application file for complete search history.

(56) References Cited

U.S. PATENT DOCUMENTS

| | | | | |
|---|---|---|---|---|
| 2,229,788 A | * | 1/1941 | Appleton | F02B 75/065 |
| | | | | 123/179.1 |
| 2,308,492 A | * | 1/1943 | Culbertson | F16H 21/36 |
| | | | | 74/52 |
| 3,203,274 A | * | 8/1965 | Barth et al. | F02B 67/04 |
| | | | | 123/192.1 |
| 3,340,748 A | | 9/1967 | Young | 74/661 |
| 4,445,337 A | * | 5/1984 | McCreary | F02B 37/105 |
| | | | | 192/48.6 |
| 4,829,850 A | | 5/1989 | Soloy | 74/665 |
| 5,623,894 A | * | 4/1997 | Clarke | F02B 25/08 |
| | | | | 123/50 R |
| 7,234,423 B2 | * | 6/2007 | Lindsay | F01L 7/04 |
| | | | | 123/188.5 |
| 7,360,511 B2 | | 4/2008 | Lemke et al. | 123/41.35 |
| 7,383,797 B2 | * | 6/2008 | Tour | F01L 3/205 |
| | | | | 123/51 BA |

(Continued)

*Primary Examiner* — Tisha D Lewis
(74) *Attorney, Agent, or Firm* — Terrance M. Meador; Julie J. Muyco

(57) ABSTRACT

A transmission for an opposed-piston engine with two crankshafts includes a crankshaft gear train that combines the torque inputs from the two crankshafts and a gear arrangement coupled to the gear train that is operable to obtain various speed ratios for an output torque drive.

6 Claims, 8 Drawing Sheets

(56) References Cited

U.S. PATENT DOCUMENTS

| | | | |
|---|---|---|---|
| 2004/0089089 A1 | 5/2004 | Stevens et al. ................. | 74/440 |
| 2008/0047530 A1 | 2/2008 | Cleeves ................... | 123/51 AA |
| 2010/0282219 A1 | 11/2010 | Alonso .................... | 123/51 AA |
| 2011/0315116 A1* | 12/2011 | Fetterplace ............. | F02B 57/08 |
| | | | 123/44 R |
| 2012/0285422 A1 | 11/2012 | Exner et al. ................ | 123/51 R |
| 2013/0160605 A1 | 6/2013 | Gmirya .................... | 74/665 GA |
| 2014/0331656 A1* | 11/2014 | Nagar ..................... | F02B 75/28 |
| | | | 60/297 |
| 2014/0332306 A1 | 11/2014 | Fuqua .......................... | 180/291 |
| 2015/0020627 A1 | 1/2015 | Palfai et al. ................ | 74/421 R |
| 2015/0020629 A1 | 1/2015 | Koszewnik et al. ............ | 74/445 |
| 2016/0033030 A1 | 2/2016 | Palfai ..................... | F16H 57/12 |

\* cited by examiner

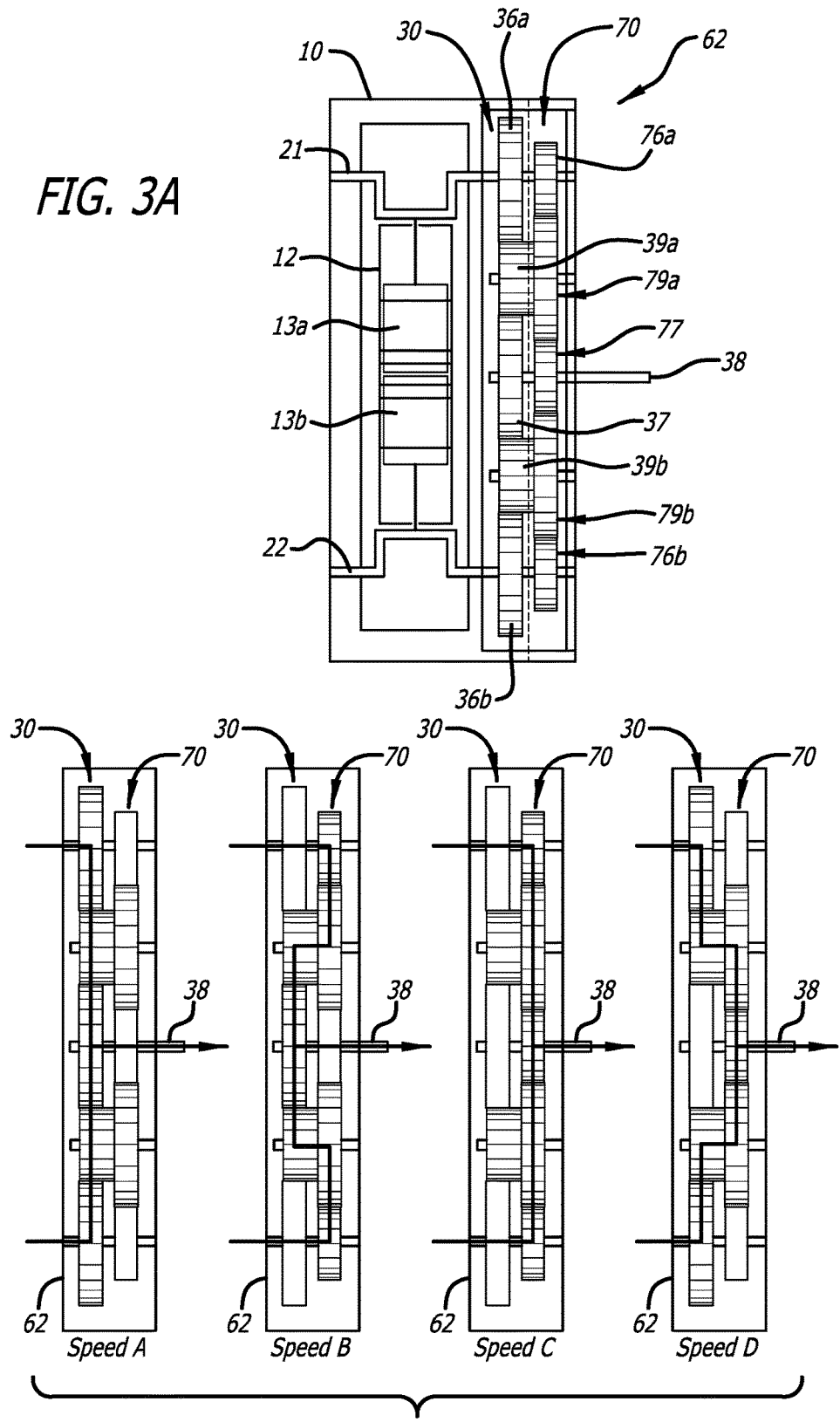

TRANSMISSIONS FOR OPPOSED-PISTON ENGINES WITH TWO CRANKSHAFTS

RELATED APPLICATIONS

This application contains subject matter related to the subject matter of the following commonly-owned US patent applications: U.S. patent application Ser. No. 13/385,539, filed Feb. 23, 2012 for "Dual Crankshaft, Opposed-Piston Engine Constructions"; U.S. patent application Ser. No. 13/891,466, filed May 10, 2013 for "Placement Of An Opposed-Piston Engine In A Heavy-Duty Truck"; U.S. patent application Ser. No. 13/944,787, filed Jul. 17, 2013 for "Gear Noise Reduction in Opposed-Piston Engines"; U.S. patent application Ser. No. 14/074,618, filed Nov. 7, 2013 for "Gear Noise Reduction in Opposed-Piston Engines"; and U.S. patent application Ser. No. 14/450,747, filed Aug. 4, 2014 for "Split Gear Assembly With One-Way Roller Clutch For Controlling Backlash In Opposed-Piston Engines".

FIELD

The field relates to a transmission for an opposed-piston engine with two crankshafts which integrates the elements of a crankshaft gear train with elements of a multispeed transmission. More specifically, the field relates to an opposed-piston engine equipped with a transmission gear box that receives torque inputs from two crankshafts of the engine and provides a multi-speed torque output drive.

BACKGROUND

FIG. 1 illustrates an arrangement of cylinders, pistons, and crankshafts in an opposed-piston engine. The figure shows a three-cylinder arrangement, although this is not intended to be limiting; in fact, the basic architecture portrayed in FIG. 1 is applicable to opposed-piston engines with fewer, or more, cylinders. The opposed-piston engine 10 includes cylinders 12, each including exhaust and intake ports 14 and 16. Preferably, the cylinders comprise liners (also called "sleeves") that are fixedly mounted in tunnels formed in an engine frame or block 18. A pair of pistons (unseen in this figure) is disposed for opposing reciprocal movement in the bore of each cylinder 12. The opposed-piston engine 10 includes an interlinked crankshaft system including two rotatably-mounted crankshafts 21 and 22 and a crankshaft gear train 30 linking the crankshafts and coupling them to a power take-off shaft ("PTO shaft"). The crankshafts 21 and 22 are mounted to the engine by main bearing arrangements (not shown), one at the bottom of the engine block 18 and the other at the top. The crankshaft gear train 30 is supported in one end of the engine block 18 and is contained in a compartment 31 therein that is accessed through a removable cover 32.

As per FIG. 1, one piston of each piston pair is coupled to a respective crank journal 23 of the crankshaft 21 by a connecting rod assembly 27; the other piston is coupled to a respective crank journal 25 of the crankshaft 22 by a connecting rod assembly 29. The crankshafts 21 and 22 are disposed with their longitudinal axes in a spaced-apart, parallel arrangement. The crankshaft gear train 30 includes a plurality of gears, including two input gears 36a and 36b, which are fixed to respective ends of the crankshafts 21 and 22 for rotation therewith. An output gear is mounted for rotation on a fixed shaft or post. The output gear 37 drives a power take-off shaft 38 about an output axis of rotation A.

In this configuration, two idler gears 39a and 39b are provided, each mounted for rotation on a fixed shaft or post. The idler gear 39a meshes with the input gear 36a and the output gear 37; the idler gear 39b meshes with the input gear 36b and the output gear 37. As a result of the configuration of the crankshaft gear train 30, the crankshafts 21 and 22 are co-rotating, that is to say, they rotate in the same direction. However, this is not meant to so limit the scope of this disclosure. In fact, a gear train construction according to this specification may have fewer, or more, gears, and may have counter-rotating crankshafts. Thus, although five gears are shown for the crankshaft gear train 30, the numbers and types of gears for any particular crankshaft gear train are dictated only by the engine design. For example, the crankshaft gear train 30 may comprise one idler gear for counter-rotation, or two idler gears (as shown) for co-rotation.

The gear train 30 shown in FIG. 1 represents a desirably convenient way to connect two crankshafts of an opposed-piston engine for stable operation and to unify the outputs of the crankshafts for delivery to a drive train via the power take-off shaft. In addition to a crankshaft gear train, a multispeed transmission is needed to convert the engine's output (speed and torque) as necessary to meet operating conditions of a drive train. In this regard, the term "transmission" also refers to a drive mechanism or gearbox comprising transmission gears arranged to selectably obtain speed ratios that match engine output to drive train requirements. In many instances, a gearbox matches engine output to the wheel speeds of a vehicle or a locomotive, or to propeller speeds of an aircraft or vessel. If the crankshaft gear train and the gearbox are provided as separate units, with torque input to the gearbox via the power take-off shaft, considerable redundancy is encountered in packaging, and the length of the drive train is necessarily extended. Combining the crankshaft gear train and the gearbox into a single unit in which an arrangement of gears receives torque inputs directly from the spaced-apart crankshafts would offer potential benefits in reducing the weight and size of the engine, and the length of the drive train.

U.S. Pat. No. 3,340,748 describes a multi-engine drive mechanism which couples two engines of an aircraft to drive a single propeller shaft by way of a single drive mechanism. The drive mechanism receives a torque input from one engine, or respective torque inputs from both engines, and allows the propeller shaft to be driven by either or both of the engines. The drive mechanism automatically establishes a predetermined speed ratio between the engines and the propeller shaft when both engines operate at the same speed. When one engine ceases operation, the drive mechanism automatically changes the speed ratio between the still operative engine and the propeller shaft in order to optimally drive the aircraft. Of course, the matter of driving a single output shaft from two independent engines involves complex mechanical logic that must be able to combine torque inputs from independent sources and dynamically adapt to different torque input combinations. In any case, the speed ratios remain fixed. In the case of a single opposed-piston engine with two crankshafts, however, the challenge is to combine two continuously-operating torque inputs in a single drive mechanism equipped to obtain various speed ratios.

SUMMARY

Thus, in some aspects, a transmission for an opposed-piston engine with two crankshafts (hereinafter, a "dual-crank opposed-piston engine") includes a crankshaft gear train that combines the torque inputs from the two crankshafts and a gear arrangement coupled to the gear train that is operable to obtain various speed ratios with which to drive a power take-off shaft.

In other aspects, a transmission for a dual-crank opposed-piston engine comprises a gear train for combining power from the crankshafts, a power take-off shaft, and a gear arrangement interposed between the gear train and the power take-off shaft for selectively providing output torque at one of a plurality of speed ratios. Preferably output torque is provided by means of a power take-off shaft.

In still further aspects, integrating the gear train of a dual-crank opposed-piston engine and with a transmission affords flexibility in supplying lubricating fluid for the engine and transmission. In some cases, the engine and transmission may be able to use the same lubricating fluid. In other cases, the transmission may require a separate lubricating fluid, as when there may be a need to cool the transmission lubricating fluid to a different extent than the engine lubricating fluid.

BRIEF DESCRIPTION OF THE DRAWINGS

FIG. 3A is a schematic representation of a multi-speed parallel gear arrangement integrated with the gear train of a dual-crank opposed-piston engine. FIG. 3B is a schematic representation of speed ratios obtainable with the gear arrangement of FIG. 3A.

DETAILED DESCRIPTION

Figure 2A:
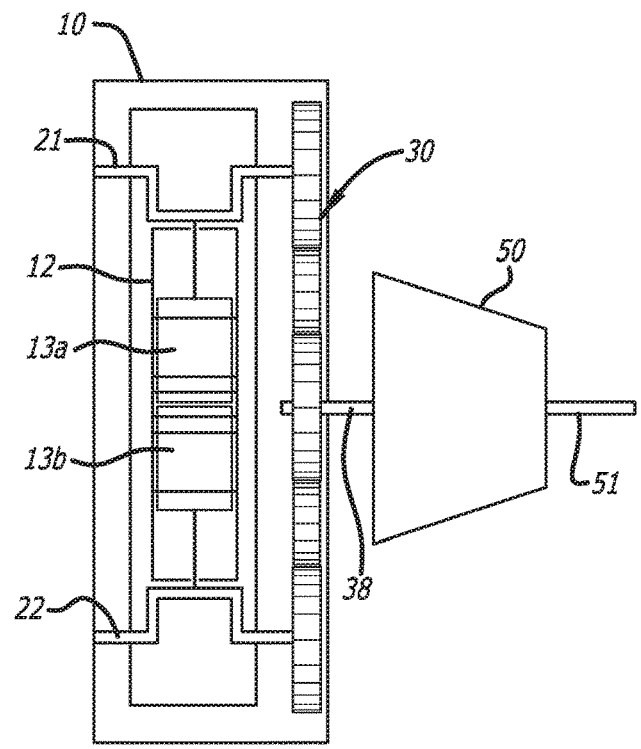
FIG. 2A is a schematic representation of a prior art drive train for a dual-crank opposed-piston engine.

Referring to the prior art transmission arrangement for dual-crank, opposed-piston engine illustrated in FIG. 2A, the crankshaft 21 and the crankshaft 22 of the engine 10 are individually rotated by movement of opposed piston pairs 13a/13b in the cylinders 12. The crankshafts 21 and 22 are coupled together, and their outputs are combined, by the crankshaft gear train 30 which provides a single, unmediated torque output drive via the power take-off (PTO) shaft 38. A multi-speed transmission embodied in a gearbox 50 converts an output drive (speed and torque) presented on the PTO shaft 38 as necessary to meet operating conditions of a drive train. A multi-speed torque output is provided to the drive train on a transmission output shaft 51.

Figure 2B:
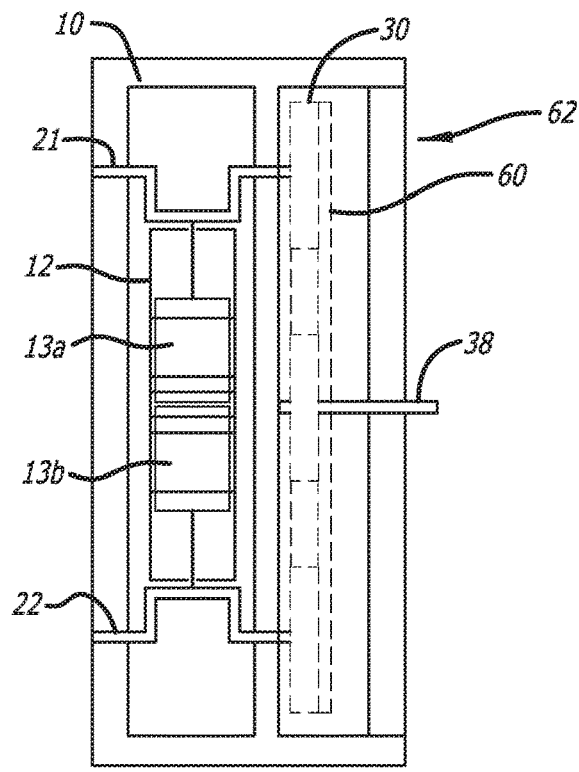
FIG. 2B is a schematic representation of a transmission for a dual-crank opposed-piston engine according to this specification.

FIG. 2B schematically illustrates the union of the crankshaft gear train 30 of the dual-crank opposed-piston engine 10 with a gear arrangement 60 for a multi-speed transmission. In this union the transmission gear arrangement 60 acts between the gear train 30 and the power take-off shaft 38, and is operable to provide a plurality of speed ratios with which to drive the power take-off shaft 38. This union eliminates the separate transmission gearbox 50 and the transmission output shaft 51 of the prior art, and makes it possible to obtain different speeds for provision to the drive train. The gear train compartment, now containing both the gear train and a multi-speed gear arrangement, becomes a transmission gearbox 62.

The union of the crankshaft gear train and a multi-speed transmission gear arrangement as per FIG. 2B may be achieved in multiple embodiments by using parallel gears, planetary gears, or a combination of parallel and planetary gears. It enables many speed combinations, ranging from minimum possible to maximum possible per packaging constraints, using various gear combinations. In some embodiments, utilization of planetary gears also enables the coupling of the crankshaft gear train with an electric motor, thereby supporting fuel-electric hybrid applications of a dual-crank opposed-piston engine.

Example 1

Figure 1:
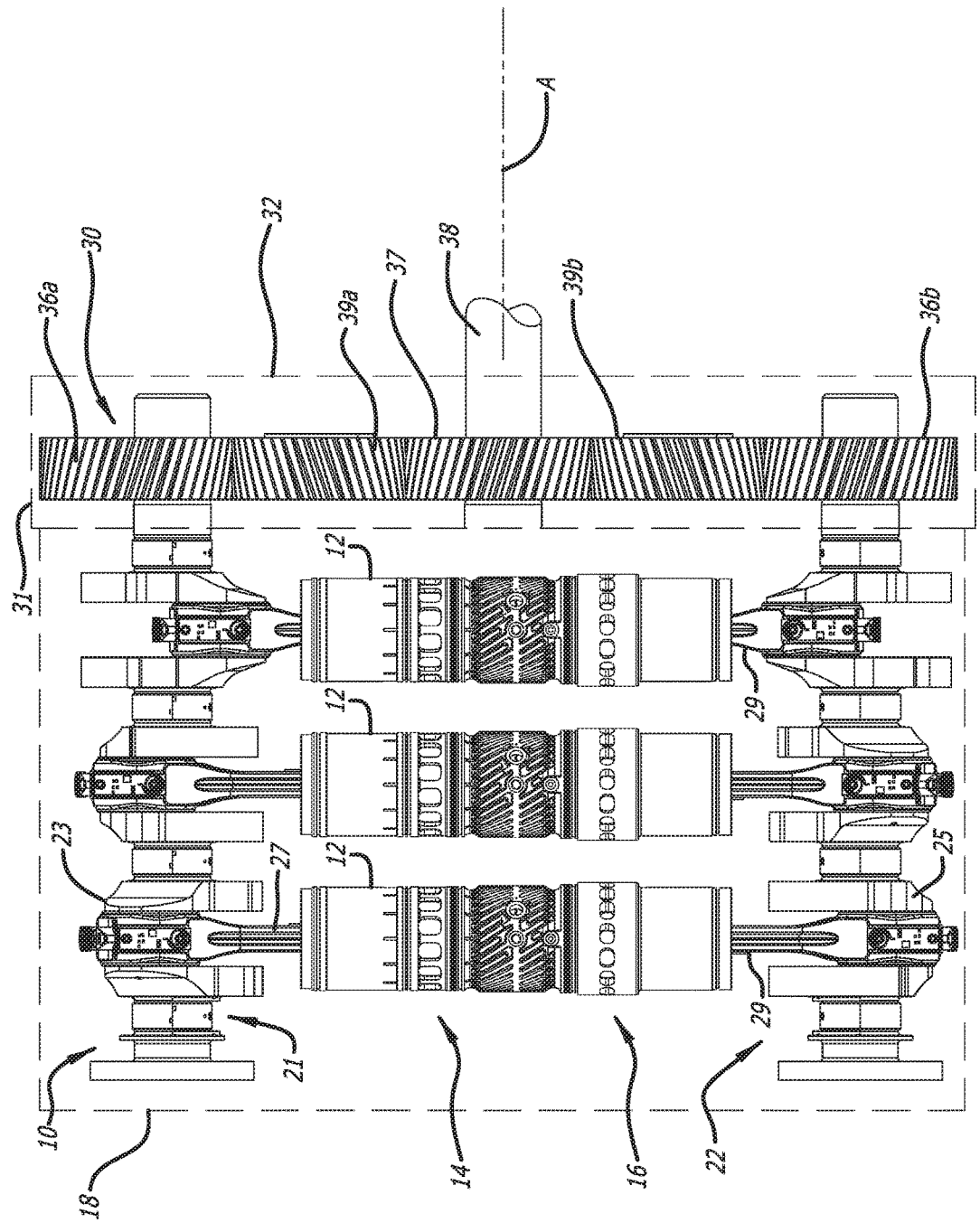
FIG. 1 is a side elevation view of a prior art arrangement of cylinders, pistons, and a gear train in a dual-crank opposed-piston engine.

FIG. 3A schematically illustrates a multi-speed parallel gear arrangement integrated with the crankshaft gear train of a dual-crank opposed-piston engine in the transmission gearbox 62. In this arrangement, the crankshaft gear train is disposed in parallel with a gear arrangement for a multi-speed transmission. The crankshaft gear train 30 is constructed as shown in FIG. 1 and a transmission gear arrangement comprising a second gear train 70 is disposed such that the crankshaft gear train 30 is located between the engine 10 and the second gear train 70. The second gear train 70 comprises a set of transmission gears including input gears 76a and 76b, output gear 77, and one or more idler gears 79. The input gear 76a of the second gear train is mounted to the end of the crankshaft 21, adjacent the input gear 36a of the crankshaft gear train, and the input gear 76b of the second gear train is mounted to the end of the crankshaft 22, adjacent the input gear 36b of the crankshaft gear train. The output gear 77 of the second gear train, is rotatably mounted adjacent the output gear 37 of the crankshaft gear train. The output gear 77 drives the rotatable PTO shaft 38. The second gear train 70 includes at least one idler gear fixed to the at least one idler gear of the crankshaft gear train 30 for rotation therewith. In this example, the second gear train 70 includes a first idler gear 79a fixed to the idler gear 39a of the crankshaft gear train 30 for rotation therewith on a stationary post, and a second idler gear 79b fixed to the idler gear 39b of the crankshaft gear train 30 for rotation therewith on another stationary post.

The input gears 36a and 76a are conventionally mounted to the end of the crankshaft 21 by respective, separately actuated, frictional coupling mechanisms (not shown). These mechanisms may be hydraulically-actuated and/or mechanically-actuated so as to permit each input gear to be locked onto and unlocked from the crankshaft, independently of the other input gear. When locked, an input gear rotates with the crankshaft; when unlocked, the input gear freewheels, driven by the idler with which it is meshed. The input gears 36b and 76b are similarly mounted to the end of the crankshaft 22. The output gears 37 and 77 are mounted to the PTO shaft 38 by respective, separately actuated, frictional coupling mechanisms (not shown). When locked, an output gear rotates the PTO shaft 38; when unlocked, the output gear freewheels, driven by an idler with which it is meshed. The frictional coupling mechanisms are conventional, and are conventionally activated. For example, the frictional coupling mechanisms may comprise hydraulically-actuated cone clutches.

The gear sizes in the crankshaft gear train 30 and the second gear train 70 are determined according to design requirements. In the example of FIG. 3A, the input and output gear sizes of the crankshaft gear train are larger than the input and output gear sizes of the second gear train 70. The idler gears 39a and 39b of the crankshaft gear train 30 are of a smaller gear size than the idler gears 79a and 79b of the second gear train 70. The frictional coupling mechanisms that act between the crankshafts and the input gears and between the output gears and the PTO shaft 38 are conventionally operated to obtain various speed ratios between the input and output gears, and thus between the torque inputs of the two crankshafts and the torque output of the PTO shaft 38. In this regard, refer to FIG. 3B in which a horizontally shaded gear is locked to a shaft and an unshaded gear is unlocked and freewheels. With reference to FIG. 3B and Table 1, a first speed (Speed A) is obtained by locking the input gears 36a and 36b to the crankshafts 21 and 22 (lock/lock), locking the output gear 37 to the PTO shaft 38 (lock), while unlocking the input gears 76a and 76b from the crankshafts 21 and 22 (unlock/unlock) and unlocking the output gear 77 from the PTO shaft 38 (unlock). As per Table 1, four speeds are obtained with the parallel gear train arrangement of FIG. 3A.

TABLE 1

|  | Input Gears 36a/36b | Output Gear 37 | Input Gears 76a/76b | Output Gear 77 |
|---|---|---|---|---|
| Speed A | lock/lock | lock | unlock/unlock | unlock |
| Speed B | unlock/unlock | lock | lock/lock | unlock |
| Speed C | unlock/unlock | unlock | lock/lock | lock |
| Speed D | lock/lock | unlock | unlock/unlock | lock |

Example 2

Figure 4A:
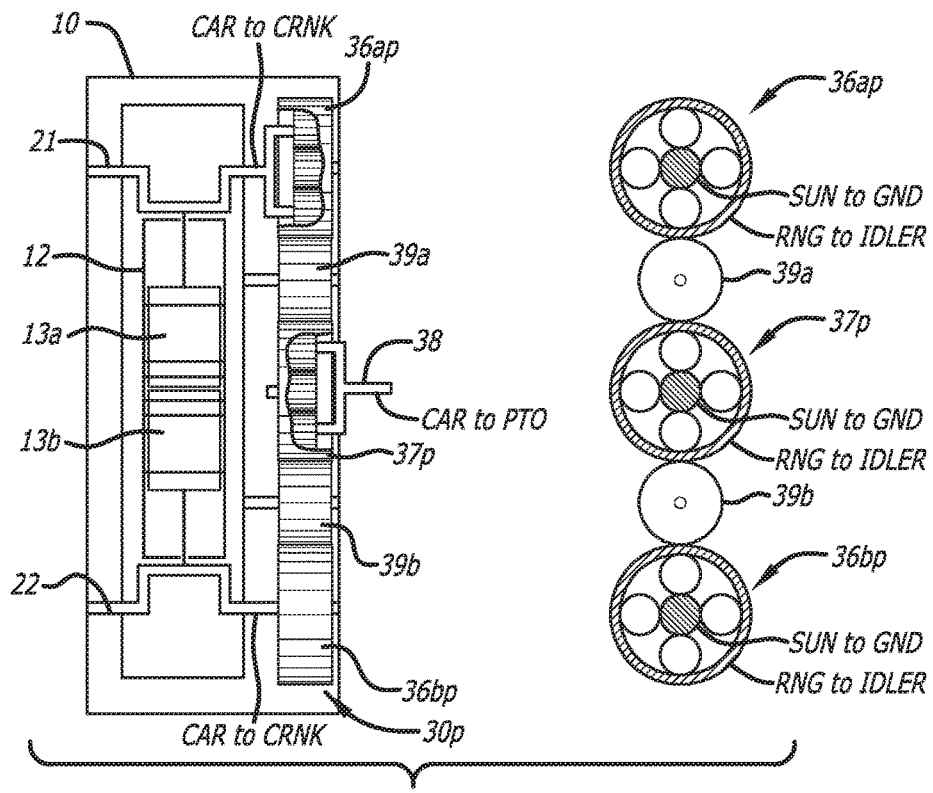
FIG. 4A is a schematic representation of a multi-speed planetary gear arrangement integrated with the gear train of a dual-crank opposed-piston engine.

FIG. 4A schematically illustrates a multi-speed planetary gear arrangement integrated with the gear train of a dual-crank opposed-piston engine. Multiple output speeds may be obtained by replacing one or more gears of the crankshaft gear train with planetary gears. In FIG. 4A the crankshaft gear train 30 comprises an arrangement of planetary gears separated by idler gears. In this example three gears—the input gears 36a and 36b, and the output gear 37—are replaced by two-speed planetary input gears 36ap, 36bp, and a planetary output gear 37p, to obtain four output speeds. Preferably, each of the planetary input gears 36ap and 36bp includes a planet carrier (CAR) fixed to the end of a respective crankshaft (CAR to CNK), a ring gear (RNG) meshed on its outer annular face with an adjacent idler gear and on its inner annular surface with the planetary gears of the planet carrier, and a sun gear (SUN) held stationary on a fixed post (GND). Each planetary input gear includes a hydraulically-actuated or a mechanically-actuated frictional coupling mechanism (not shown) that permits the ring gear and planet carrier to be locked together so as to rotate at the same speed and unlocked so as to rotate at different speeds. Thus, each planetary input gear 36a and 36b converts the input speed of the crankshaft to which its planet carrier is fixed to a first output speed of its ring gear when its ring gear and planet carrier are locked together and to a second output speed of its ring gear when its ring gear and planet carrier are unlocked. In the example shown in FIG. 4B, the speed ratio thus obtained by each planetary input gear is 1:1 when the ring gear and planet carrier are locked; when the ring gear and planet carrier are unlocked, the speed ratio is 1:1.22. The speed ratio thus obtained by the planetary output gear is 1:1 when the ring gear and planet carrier are locked; when the ring gear and planet carrier are unlocked, the speed ratio is 1:1.5.

With reference to FIG. 4A, the planetary output gear 37p includes a planet carrier (CAR) fixed to the PTO shaft 38 (CAR to PTO), a ring gear (RNG) meshed on its outer annular face with adjacent idler gears 39a and 39b (RNG to IDLER), and on its inner annular surface with the planetary gears of the planet carrier, and a sun gear (SUN) held stationary on a fixed post (GND). The planetary output gear 37p includes a hydraulically-actuated or a mechanically-actuated frictional coupling mechanism (not shown) that permits the ring gear and planet carrier to be locked together so as to rotate at the same speed and unlocked so as to rotate at different speeds. In the example shown in FIG. 4B, x is an input speed at which the crankshafts rotate. The PTO shaft 38 rotates at an output speed of x (the input speed) multiplied by factor having a value determined a combination of locked and unlocked conditions of the planetary gears.

Figure 4B:
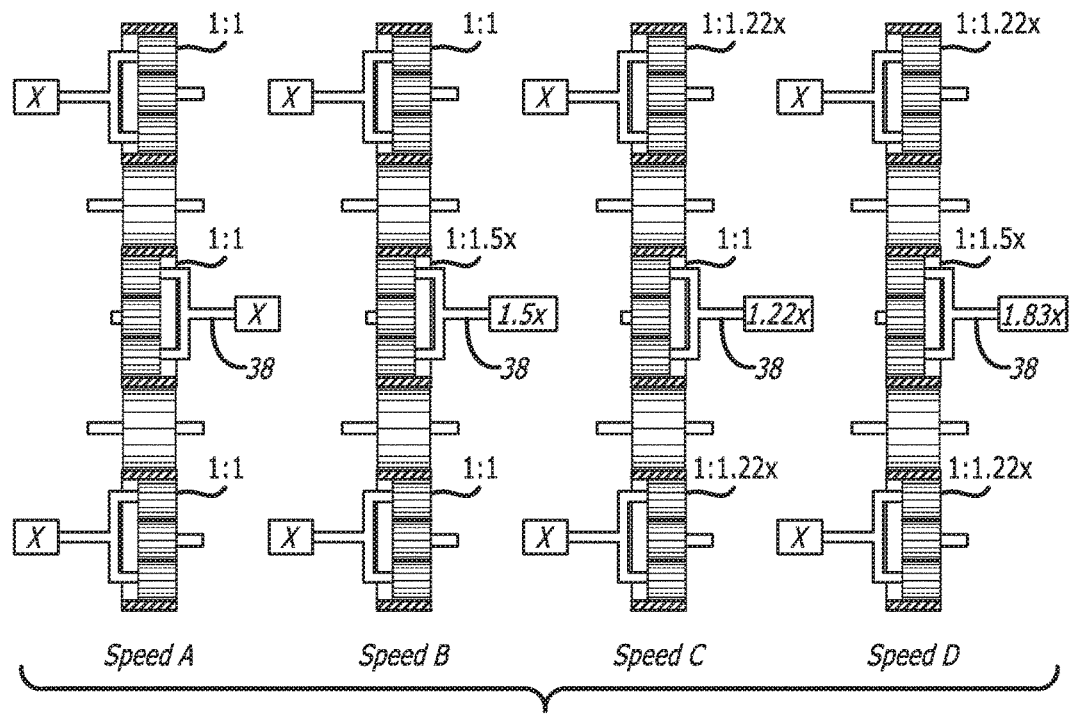
FIG. 4B is a schematic representation of speed ratios obtainable with the gear arrangement of FIG. 4A.

As per FIGS. 4A and 4B, the frictional coupling mechanisms that act between the planet carriers and ring gears of the planetary input gears 36ap and 36bp and between the planet carrier and ring gear of the planetary output gear 37p are conventionally operated in order to obtain various speed ratios between the planetary input and output gears, and thus between the torque inputs of the two crankshafts and the torque output of the PTO shaft 38. In this regard, with reference to FIG. 4B and Table 2 a first speed (Speed A) is obtained by locking the planet carrier to the ring gear (lock CAR/RNG) of both planetary input gears 36ap and 36bp, and locking the planet carrier to the ring gear (lock CAR/RNG) of the planetary output gear 37p. As per FIG. 4B and Table 2, four speeds are obtained with the planetary arrangement of FIG. 4A.

TABLE 2

|  | Input Gear 36ap | Output Gear 37 | Input Gear 36bp |
|---|---|---|---|
| Speed A | lock CAR/RNG | lock CAR/RNG | lock CAR/RNG |
| Speed B | lock CAR/RNG | unlock CAR/RNG | lock CAR/RNG |
| Speed C | unlock CAR/RNG | lock CAR/RNG | unlock CAR/RNG |
| Speed D | unlock CAR/RNG | unlock CAR/RNG | unlock CAR/RNG |

Example 3

Figure 5:
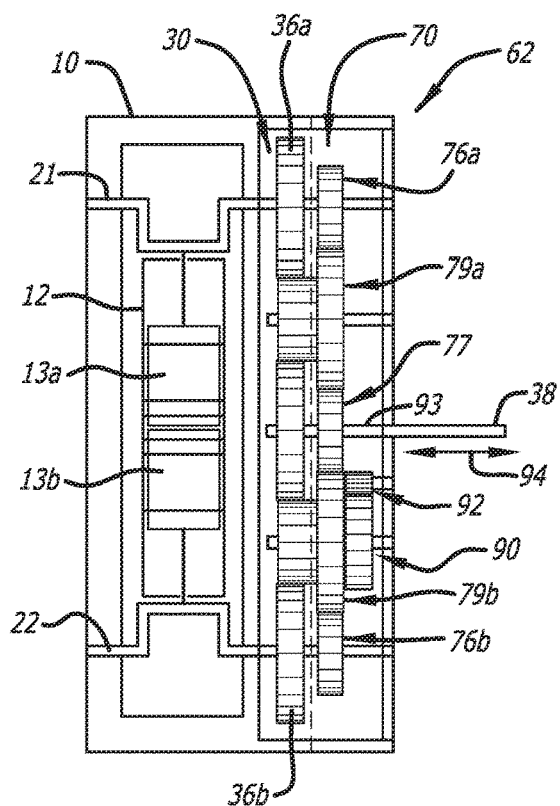
FIG. 5 is a schematic representation of the multi-speed parallel gear arrangement of FIG. 3A with a reverse gear.

As seen in FIG. 5, the parallel gear train arrangement of FIG. 3A may be equipped with a reverse gear arrangement by mounting a gear 90 fixed to rotate with a pair of idler gears on a stationary post. The parallel gear train arrangement of FIG. 5 has a first state providing a forward gear range output and a second state providing a reverse gear output. A smaller, reverse gear 92 meshed with the gear 90 is mounted to rotate on a stationary post. The output gear 77 of the second gear train 70 is mounted on a moveable spline shaft 93. A hydraulically actuated and/or mechanically-actuated means is provided to move the spline shaft 93 into and out of engagement with the reverse gear 92 as shown by the arrow 94. When the spline shaft 93 disengages the reverse gear 92, the parallel gear arrangement provides a forward gear range that comprises the four speeds illustrated in FIG. 3B and Table 1. When the spline shaft 93 engages the reverse gear 92, the parallel gear arrangement provides a reverse gear output on the PTO shaft 38.

Example 4

Figure 6:
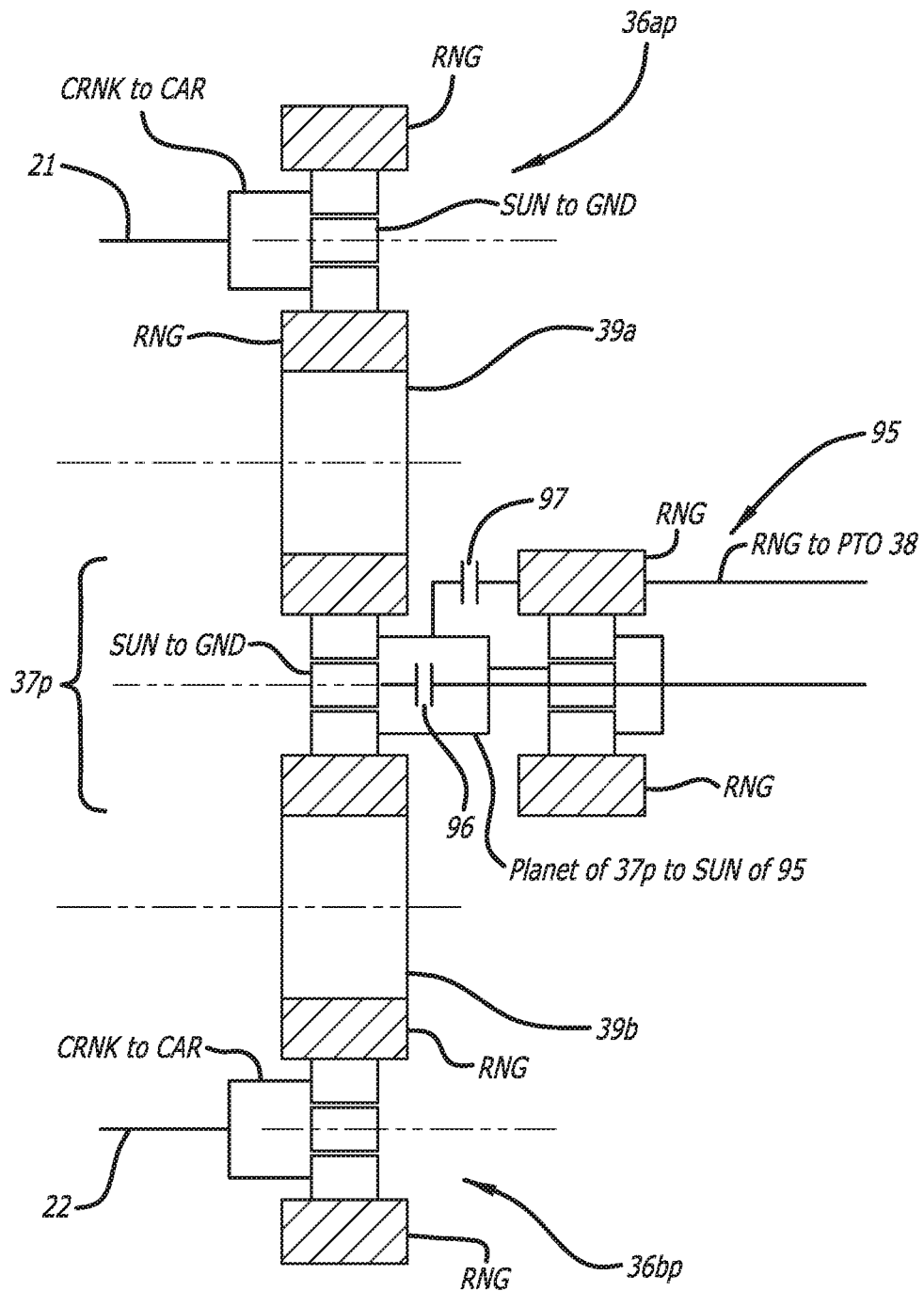
FIG. 6 is a schematic representation of the multi-speed gear arrangement of FIG. 4A with a reverse gear.

As seen in FIG. 6, the gear train of FIG. 4A may be modified with a reverse gear arrangement in which a fourth planetary gear 95 is disposed concentrically with the planetary gear 37p in a double-planetary gear drive configuration that constitutes the output of the modified crankshaft gear train. The double-planetary drive configuration has a first state providing a forward gear range output and a second state providing a reverse gear output. The double-planetary gear drive configuration has two stages. The first stage comprises the planetary gear 37p, and the second stage comprises the planetary gear 95. The two-stage arrangement includes first and second hydraulically-actuated or mechanically-actuated frictional coupling mechanisms 96 and 97. The frictional coupling mechanism 96 (for example, a clutch) permits the grounded sun gear of the first stage 37p to be locked to and unlocked from the planet carrier of the second stage 95. The frictional coupling mechanism 97 (for example, a clutch) permits the ring gear of the second stage 95 to be locked to and unlocked from the planet carrier of the first stage 37p. The planet carrier of first stage 37p is rigidly connected to the sun gear of second stage 95. The output of the gear-train is taken from the ring gear in the second stage 95, which is coupled to the PTO shaft 38 (RNG to PTO 38). For the forward gear range output, the ring gear of the second stage 95 is locked by 97 to the planet carrier of the first stage 37p. The planet carrier of the second stage 95 is unlocked by 96 from the grounded sun gear of the first stage 37p, whereby the whole second stage 95 rotates as a single unit at one of the four forward speeds determined by a gear train setting illustrated in FIG. 4B. When the planet carrier of the second stage 95 is held stationary by being locked to the sun gear of the first stage 37p, the ring gear of the second stage 95 reverses direction and provides reverse gear output on the PTO shaft 38 that rotates at $Z_{SUN}/Z_{RNG}$ times the speed of the sun gear, where $Z_{SUN}$ is the tooth count of the sun gear of the second stage 95 and $Z_{RNG}$ is the tooth count of the ring gear of the second stage 95.

Example 5

Figure 7:
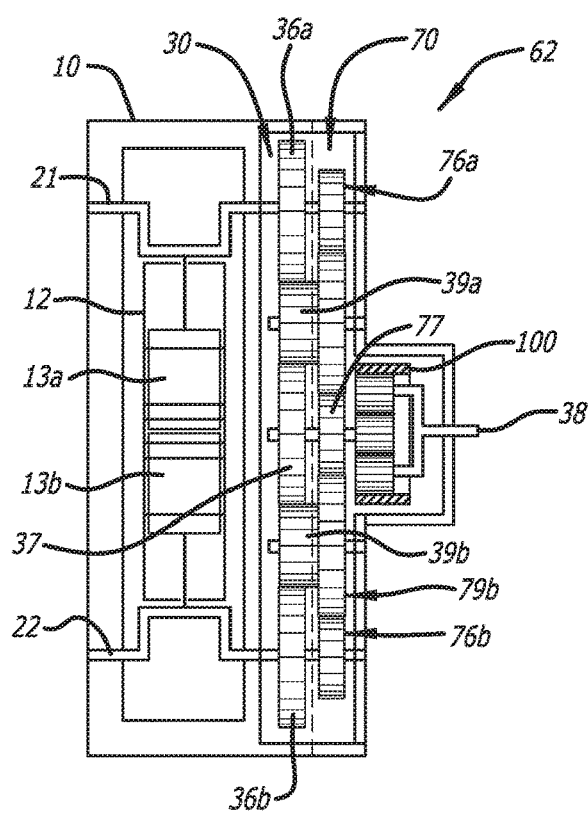
FIG. 7 is a schematic representation of a multi-speed hybrid gear arrangement integrated with the gear train of a dual-crank opposed-piston engine.

As seen in FIG. 7, a two-speed planetary gear 100 may be added to the parallel gear train arrangement of FIG. 3A to increase the number of speed ratios available from the gearbox. In this configuration, the sun gear of the planetary gear 100 is rigidly connected to the shaft which is driven by one or the other of the output gears 37 and 77. Thus, the sun gear is driven by the crankshafts (SUN to CRK) and rotates at the four speeds illustrated in FIG. 3B and Table I. The ring gear of the two-speed planetary gear 100 is grounded (RNG to GND), and so does not rotate. The planet carrier of the two-speed planetary gear 100 is rigidly connected to the PTO shaft 38 (CAR to PTO). The two-speed planetary gear 100 includes a hydraulically-actuated or a mechanically-actuated frictional coupling mechanism (not shown) that permits the sun gear and planet carrier to be locked together so as to rotate at the same speed and unlocked so as to rotate at different speeds. When the sun and planet carrier are locked together, the PTO shaft 38 rotates at the four speeds illustrated in FIG. 3B and Table I. When the sun and planet carrier are unlocked, the PTO shaft 38 rotates at four additional speeds related to the four speeds illustrated in FIG. 3B and Table I by $Z_{SUN}/Z_{PLANET}$ times the speed of the sun gear, where $Z_{SUN}$ is the tooth count of the sun gear and $Z_{PLANET}$ is the tooth count of a planet gear carried by the planet carrier.

Example 6

Figure 8:
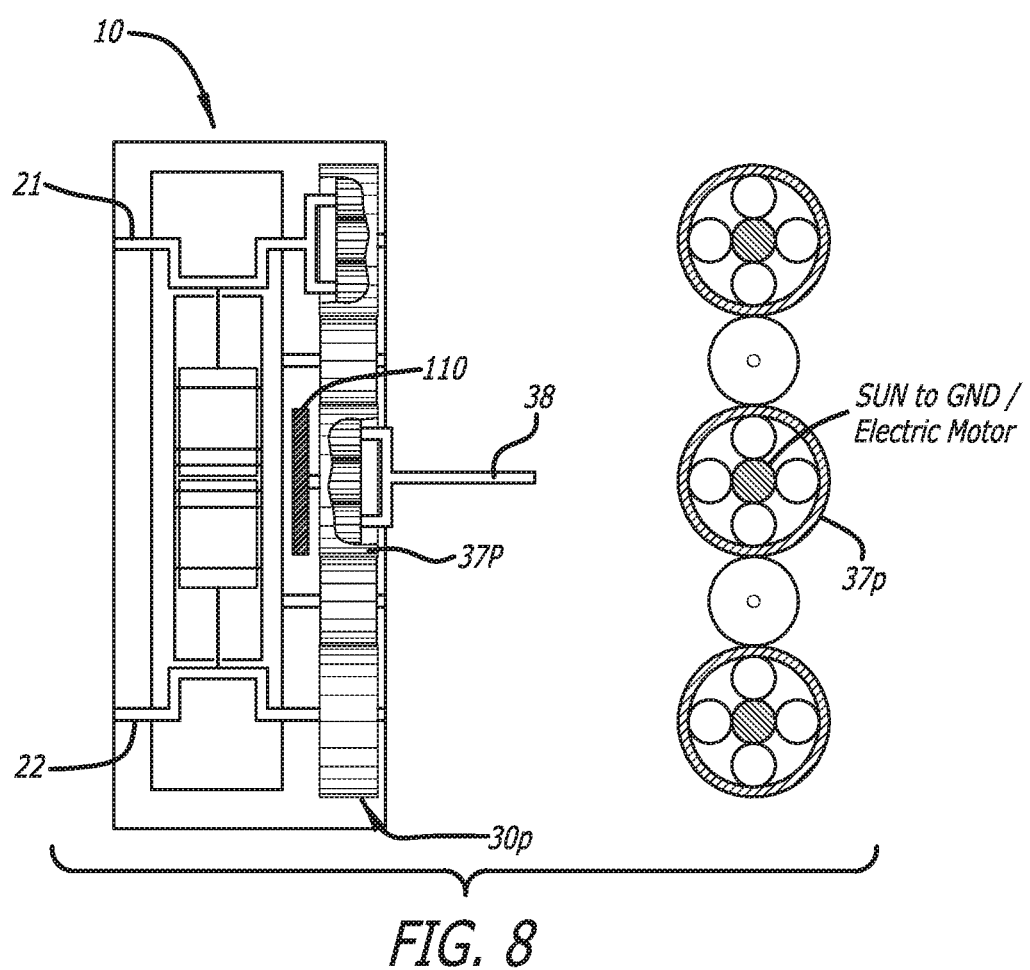
FIG. 8 is a schematic representation of a multi-speed planetary gear arrangement integrated with the gear train of a hybrid, dual-crank opposed-piston engine.

As seen in FIG. 8, the planetary gear arrangement of FIG. 4A enables the coupling of the crankshaft gear train with an electric motor 110, thereby supporting fuel-electric hybrid applications of a dual-crank, opposed-piston engine. The electric motor 110 is connected to the sun gear of PTO shaft planetary output gear 37p with a one-way clutch (SUN to GND/ELECTRIC MOTOR). When the electric motor 110 does not rotate, the sun gear is grounded (stationary). When the motor over-rotates ground, which is to say that the angular velocity (in RPM) of the motor is greater than zero, speed is added to the PTO shaft 38 in a continuously variable way. The speed of the electric motor 110 is independent of the engine 10 speed. Generally, the combined output speed (engine+motor) at the PTO shaft 38 is given by:

$$\omega_{CAR}=(Z_{SUN}*\omega_{SUN}+Z_{RNG}*\omega_{RNG})/(Z_{SUN}+Z_{RNG}) \ldots$$
Where:

$\omega_{CAR}$: angular velocity of planet carrier
$Z_{SUN}$: tooth count of SUN gear
$\omega_{SUN}$: angular velocity of Sun
$Z_{RNG}$: tooth count of RING gear
$\omega_{RNG}$: angular velocity of RING gear Manifestly, when $\omega_{SUN}=0$, the speed ratios of FIG. 4B and Table 2 are obtained.

Lubrication Options:

Integrating crankshaft and transmission gear trains provides an opportunity for using a single fluid (engine oil) to lubricate both the engine and transmission. In cases where the transmission requires a separate fluid, there may be a need to cool the transmission fluid and the integrated crankshaft-transmission gear train system has the potential to simplify the transmission fluid cooling circuit.

Figure 9:
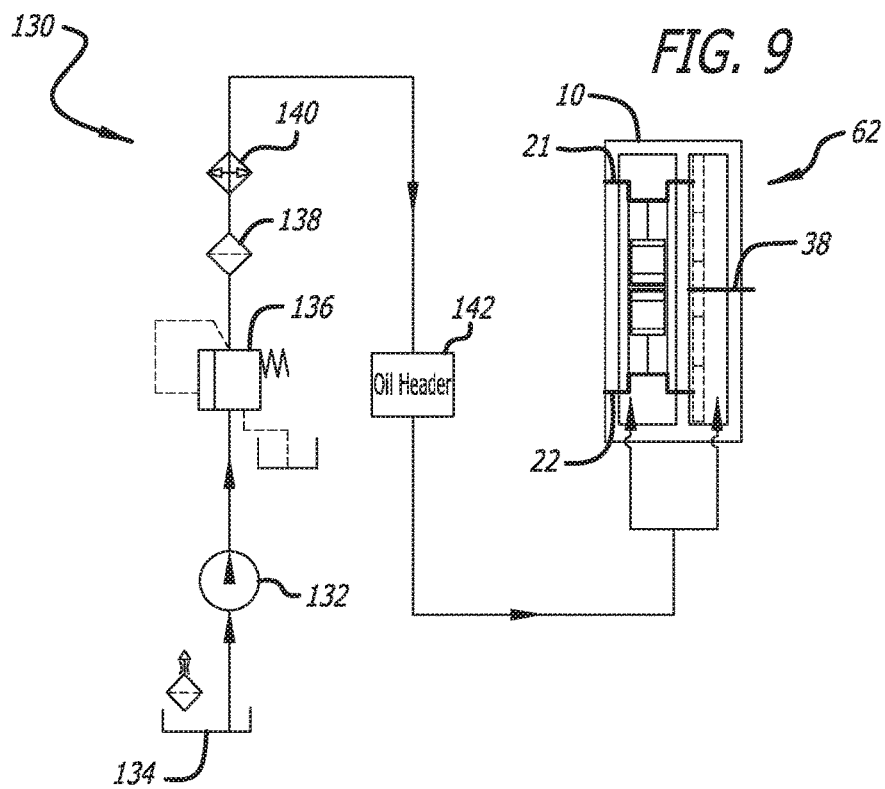
FIG. 9 is a schematic representation showing a common lubrication system for a transmission and a dual-crank opposed-piston engine.

With reference to FIG. 9, a common lubricating fluid (oil, for example) may be used to lubricate both the engine and the transmission. As shown in the circuit diagram, a single engine lubricating fluid can be shared between engine and transmission by way of a lubrication system comprising an oil delivery network 130. The network 130 comprises a mechanically-driven pump 132 that pressurizes oil collected in a common sump 134 and delivers pressurized oil through a pressure relief valve 136, a filter 138, and a cooler 140 to an engine oil header 142. The pressure relief valve 136 regulates the oil pressure by returning oil to the sump 134. The header 142 distributes the pressurized oil to various elements of the engine 10, including the gearbox 62 that cabins the unified crankshaft/transmission gear assembly.

Synthetic, mineral, multi-grade or straight SAE grade engine oils are potential candidates for use as common lubricating fluid for the engine and the transmission. The common lubricating fluid may provide several advantages such as a simpler lubricating circuit, common accessories such as oil sump/filter/oil cooler/valves, fewer dynamic oil seals, low friction losses, ease of maintenance, one oil change interval, low engine weight, and low cost. A disadvantage of using common lubricating oil may be accelerated oil shearing due to gear mesh and roller bearings loads. Oil shearing causes the oil to thin down to a grade that weakens the oil film thickness between rubbing components and eventually leads to inadequate lubricating properties for engine components. Special oil formulations can be used to provide high shear stability and also better gear shift in the integrated engine/transmission application.

Figure 10:
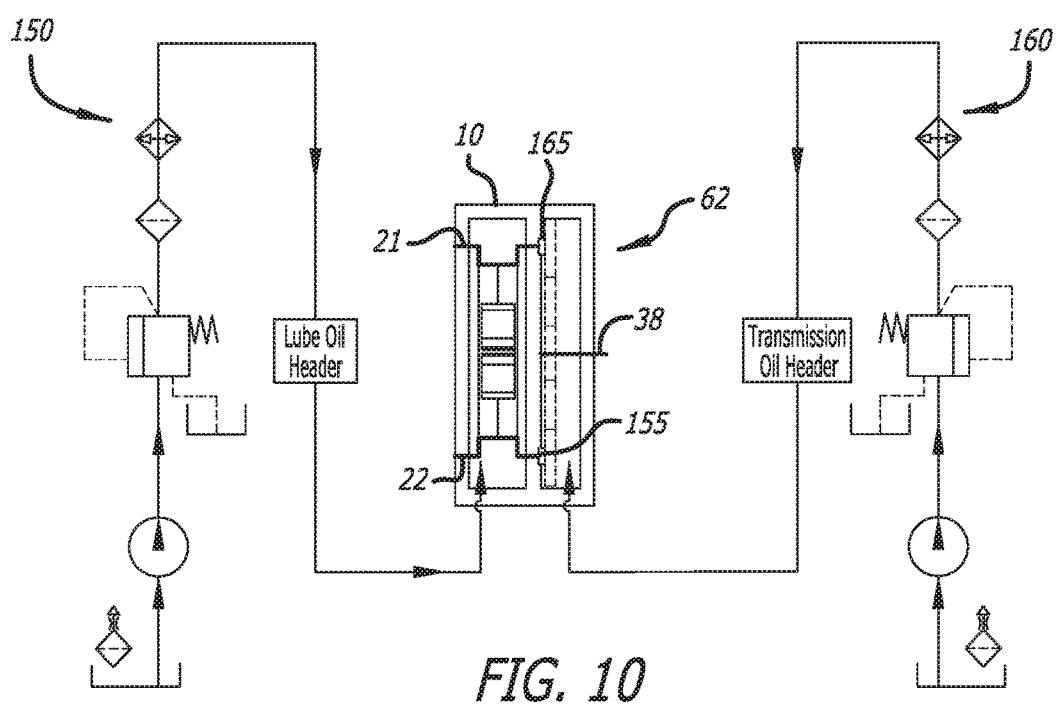
FIG. 10 is a schematic representation showing separate lubrication systems for a transmission and a dual-crank opposed-piston engine.

With reference to FIG. 10, separate lubricating fluids may be provided through separate oil supply networks 150 and 160. The oil supply networks 150 and 160 are essentially duplicates of the network 130 of FIG. 9, with the exception that the oil supply network 150 supplies one oil to lubricate the engine 10 and the oil supply network 160 supplies another, different oil to lubricate the gearbox 62. Dynamic seals 165 are seated in those openings where the end sections of the crankshafts 21 and 22 extend from the engine 10 into the gearbox 62. Each dynamic seal 165 acts between a respective one of the crankshafts 21 and 22 and a wall of the engine block to maintain separation of the two different lubricating fluids in the engine.

INDUSTRIAL APPLICATIONS

In the examples and embodiments thus far described, the dual-crank, opposed-piston construction is characterized by parallel alignment of the crankshafts with the longitudinal axes of the cylinders extending orthogonally to, and intersecting, the longitudinal axes of the crankshafts. In this construction each piston is coupled to only one of the two crankshafts. The principles of gearbox construction according to this specification are not intended to be limited to this dual-crankshaft construction, and they may be applied also to other dual-crankshaft, opposed-piston engines. In some instances, the cylinders and crankshafts may be arranged such that each piston is coupled to both crankshafts. One such example is described in U.S. Pat. No. 8,539,918 which is commonly-owned herewith.

Principles of gearbox construction for dual-crankshaft, opposed-piston engines have been described with reference to certain embodiments and examples. However, it should be understood that various modifications can be made without departing from the scope of these principles. Accordingly, the scope of patent protection for these principles is limited only by the following claims.

The invention claimed is:

1. A transmission for an opposed-piston engine with two spaced-apart crankshafts, comprising:
a gear train that links the two crankshafts together;
a rotatable power take-off shaft; and,
a gear arrangement acting between the gear train and the power take-off shaft that is operable to provide a plurality of speed ratios with which to drive the power take-off shaft, the gear arrangement comprising a set of transmission gears disposed in parallel with the gear train,
in which the gear train comprises:
input gears, each input gear mounted to an end of a respective crankshaft;
an output gear coupled to the power take-off shaft; and
at least one idler gear mounted for rotation between one of the input gears and the output gear,
and further in which the set of transmission gears comprises:
transmission input gears, each transmission input gear mounted to an end of a respective crankshaft, adjacent an input gear of the gear train;
a transmission output gear coupled to the power take-off shaft, adjacent the output gear of the gear train; and
at least one transmission idler gear fixed to the at least one idler gear of the gear train for rotation therewith.

2. The transmission of claim 1, in which the gear arrangement comprises a reverse gear arrangement.

3. An opposed-piston engine with two crankshafts coupled to the transmission of claim 1.

4. A system, comprising:
an opposed-piston engine;
the transmission of claim 1; and
a lubrication system operable to deliver lubricant to the opposed-piston engine and the transmission.

5. The system of claim 4, in which the lubrication system is operable to deliver the same lubricant to the opposed-piston engine and the transmission.

6. The system of claim 4, in which the lubrication system is operable to deliver a first lubricant to the opposed-piston engine and a second lubricant to the transmission.

* * * * *

UNITED STATES PATENT AND TRADEMARK OFFICE
CERTIFICATE OF CORRECTION

PATENT NO. : 10,260,598 B2  
APPLICATION NO. : 15/142261  
DATED : April 16, 2019  
INVENTOR(S) : Kulkarni et al.

Page 1 of 1

It is certified that error appears in the above-identified patent and that said Letters Patent is hereby corrected as shown below:

In the Specification

Column 6, Line 4, delete "36a and 36b" and replace with "36ap and 36bp"

Signed and Sealed this  
Eleventh Day of June, 2019

Andrei Iancu  
*Director of the United States Patent and Trademark Office*